No. 731,175. PATENTED JUNE 16, 1903.
J. T. GOODMAN.
EDUCATIONAL DEVICE.
APPLICATION FILED MAR. 3, 1903.
NO MODEL.
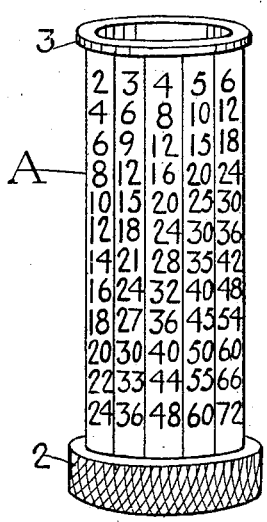
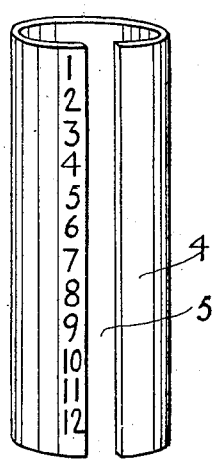
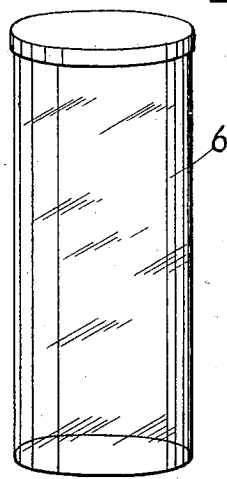
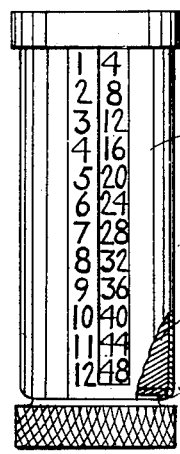
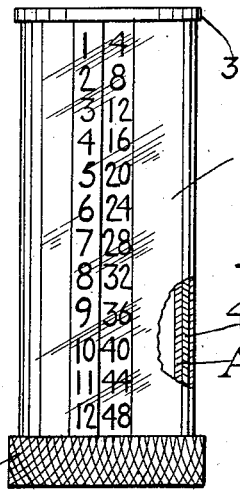
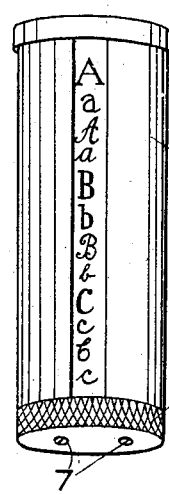
WITNESSES:
INVENTOR.
Joseph T. Goodman
BY
Geo. H. Strong
ATTORNEY.

No. 731,175.

Patented June 16, 1903.

UNITED STATES PATENT OFFICE.

JOSEPH T. GOODMAN, OF ALAMEDA, CALIFORNIA.

EDUCATIONAL DEVICE.

SPECIFICATION forming part of Letters Patent No. 731,175, dated June 16, 1903.

Application filed March 3, 1903. Serial No. 145,961. (No model.)

*To all whom it may concern:*

Be it known that I, JOSEPH T. GOODMAN, a citizen of the United States, residing at Alameda, county of Alameda, State of California, have invented an Improvement in Educational Devices; and I hereby declare the following to be a full, clear, and exact description of the same.

My invention relates to improvements in mechanical devices for facilitating study in numbers, letters, word construction, and the like on the part of little children. Its object is to provide a simple, entertaining, indestructible, and inexpensive means for presenting subjects of study to the beginner in lieu of the ordinary text-books.

It consists of the parts and the construction and combination of parts hereinafter more fully described, having reference to the accompanying drawings, in which—

Figure 1 is a perspective view of the core detached. Fig. 2 is a perspective view of the slotted casing. Fig. 3 is a view of the outer transparent tube. Fig. 4 is a side elevation of the parts assembled, part of the core, casing, and outer tube being broken away. Figs. 5 and 6 are modifications to be referred to.

In the teaching of arithmetic, for instance, by the ordinary method it is always a matter of difficulty for the infant mind to comprehend the relationship of numbers when multiplied together as viewed upon the printed page of a book. Confusion arises from the mass of collateral matter usually upon the page and which is temporarily, at least as far as the child is concerned, disconnected from the one idea he is endeavoring to grasp. The same difficulty arises in the effort to learn the alphabet, where the attention is diverted to other letters before any one particular letter becomes fixed in the mind.

My invention comprises a rotatable device wherein various related characters or symbols may be presented successively to view for observation and study.

A represents a rigid, preferably hollow, cylindrical core having an annular milled flange 2 at one end and a shallow annular flange 3 at the other. As shown in Figs. 1 and 4, where the core is adapted for purposes of teaching the multiplication-tables, the periphery of this core is provided with a series of columns of figures, the numbers in each column arranged from top to bottom in arithmetical progression and the number of columns depending on the number of tables which it is desired to illustrate. Thus the figures at the top of the columns, beginning with "2," run successively around the core, while the columns, headed by "2," "3," "4," &c., run downward in multiples of said numbers—as, for instance, the column headed by "2" will read from top to bottom, thus:

"2"
"4"
"6"
"8"
&c.

An opaque cylinder 4, of suitable material, such as celluloid, and having a longitudinal slot 5, is adapted to slip around the core and seat between flanges 2 and 3. When in position on the core, the outer surface of the cylinder is preferably just flush with flange 3, which serves to retain the parts in relative position with each other, and the opposite edges of the slot are separated a space to disclose only a single column of figures at one time. On cylinder 4, at the left-hand side of and adjacent to the slot, is printed a column of figures, beginning with "1" at the top and running downward successively and spaced correspondingly with the figures on A.

A tube 6, of suitable transparent material, as celluloid, and closed at one end, is slipped over the core and slotted cylinder 4 and adapted to abut against flange 2, the outer surface of cylinder 4 first having been treated to an application of a suitable paste or cement. Consequently when tube or cap 6 is so slipped over and sufficient time has elapsed for the cement to set, the cap and slotted cylinder are inseparably united, while the core, carrying its several columns of figures, is freely rotatable within. The flange 3, bearing on the inner end of the slotted cylinder, retains the parts in position. The inclosure of the slotted cylinder in the transparent casing 6 prevents any damage to the former and the access of any dirt between the cylinder and core.

In operation the article is lightly grasped in one hand and the milled projecting end of the core turned with the other hand to bring any desired column on the core into view through slot 5. Thus suppose it is desired to know the product of four multiplied by twelve: The core is turned to bring the column headed by "4" into the slot-opening, and a glance at the amount in that same column opposite "12" on the cylinder 4 gives the desired answer, which is "48." The product of four times any other number less than twelve is determinable in the same manner. Likewise the several tables from one to twelve may be singly presented to the learner. Thus the numbers of the slotted cylinder express always a definite relationship toward those on the rotatable core.

The device so constructed is cheap, light, attractive and furnishes practically an indestructible text.

The same principle of a rotary text is applicable for teaching the alphabet, spelling, &c.

In Fig. 6 is shown a modification in which the core has columns of letters instead of numerals upon its periphery, each column containing a certain number of letters, so that all the letters of the alphabet and all the different ways in which each letter may be printed or written (as capital "A," small "a," script, &c.) may be shown on the core. The slotted opaque cylinder 4', having one end closed, slips over the core, and a cap 6' fits over the opposite end of the core and cylinder and is secured to the core by screws 7 or other suitable securing means. In this case the slot is uncovered and the milled cap 6' affords means for turning the core in relation to the slotted case. The latter in this instance serves simply as a guide to block out all such letters or characters except those appearing through the slot. The same form of device is applicable as a multiplier.

In Fig. 5 is shown still another way of constructing the device, in which the charactered part A is rotatable within a slotted case 4, the two being held together by crimping the lower edges of the case over an annular bead on part A, as indicated at 8.

Having thus described my invention, what I claim, and desire to secure by Letters Patent, is—

1. In an educational device, the combination of a rotatable core having outwardly-projecting flanges at the ends, and an opaque slotted case inclosing said core and of less length than said core, said case seating endwise between said flanges and said core, having symbols or characters upon its periphery and viewable through the slot in said case.

2. In an educational device, the combination of a cylindrical core having outstanding flanges surrounding the ends, an opaque slotted casing for said core of less length than the core and of such length that it seats endwise between the flanges, one of said flanges forming means exterior to the casing for engaging the core to rotate it, said core having symbols or characters viewable only through the slot in said casing.

3. In an educational device, the combination of a rotatable part having transversely-extending flanges at the ends, an inclosing independent opaque slotted part of less length than the first-named part and of such length that it fits between the flanges thereof, symbols or characters on each of said parts, the symbols or characters on the rotatable part viewable through the slot in the other part and bearing a definite relation to the symbols or characters on the latter.

4. An educational device consisting in combination of a rotatable part having flanges at the ends, an independent opaque slotted part inclosing said rotatable part and lying between the flanges of the first-named part, one of said flanges serving as external means for rotating the first-named part, and said flanges forming means for retaining the two in position, and a transparent cap or cover secured to said slotted part, characters upon the slotted part adjacent to said slot and characters upon the rotatable part viewable through said slot and bearing a definite relation to the first-named characters.

In witness whereof I have hereunto set my hand.

JOSEPH T. GOODMAN.

Witnesses:
P. V. MIGHELS,
CHAS. E. TOWNSEND.